July 24, 1956  E. WIDMER  2,755,680
INSTRUMENT SERVOMOTOR FOR TORQUE AMPLIFICATION
IN MEASURING APPARATUS AND THE LIKE
Filed July 15, 1954

INVENTOR
ERNST WIDMER
BY Morgan, Finnegan, Durham, & Pine
HIS ATTORNEYS

United States Patent Office
2,755,680
Patented July 24, 1956

2,755,680

INSTRUMENT SERVOMOTOR FOR TORQUE AMPLIFICATION IN MEASURING APPARATUS AND THE LIKE

Ernst Widmer, Zug, Switzerland, assignor to Landis & Gyr A. G., Zug, Switzerland, a corporation of Switzerland Application July 15, 1954, Serial No. 443,631

7 Claims. (Cl. 74—388)

The present invention relates to a servomotor mechanism especially adapted for use with delicate instruments for amplifying the torque between a driven and a driving shaft of an instrument.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations and improvements herein shown and described.

The accompanying drawings, referred to herein and constituting a part hereof illustrate one embodiment of the invention, and together with the description, serve to explain the principles of the invention.

The present invention has for its object the provision of a novel and improved servomotor mechanism for amplifying the torque between the driven and driving shafts of a delicate instrument and which can be operated for long periods of time without attention, is of simple construction, and can be operated at relatively fast speeds or as slowly as is required. The invention further provides a torque-amplifying servomotor mechanism of compact form which places substantially no load on the driving shaft which is controlled by the measuring member, and yet which provides ample power for the operation of recording or registering mechanism to be actuated in accordance with the measured values.

In instrument-making there is encountered at times the problem of amplifying the torque of a rotary measuring member. It is generally required of a mechanical torque amplifier that the rotational speed, angular velocity and angular acceleration of the driving and the driven shaft equal each other. Such torque amplifiers are complicated and expensive apparatus, being provided with a control mechanism in which the secondary shaft driven by a servomotor is made to lag slightly behind the driven shaft together with an accurate exploration of the driving shaft. However, in many cases in instrument-making, it is sufficient that the torque amplifiers provide only equality of the rotational speed or proportionality, and in which the continuous rotation of a driving shaft may be transmitted as an intermittent rotation of the driven shaft. For such cases, known mechanisms have provided a step to be lifted periodically by the driving shaft which checks and releases the driven shaft subjected to a higher torque, e. g. from a servomotor or from a periodically wound spring, so that the angle of the rotary step of the driven shaft is equal or proportional to the angle of rotation of the driven shaft for a check release.

In the case of torque amplifiers, it is particularly important that the lag mechanism put as little load as possible on the driving shaft driven by or controlled by the measuring member. The present invention provides a torque amplifier of the latter kind which satisfies the foregoing requirement and is able to follow relatively great speeds of rotation, requires no attendance in long operational use, and can be constructed in a small size.

The present invention as preferably embodied includes a gearing with a servomotor for amplifying the torque between a driving and a driven shaft, which gearing is provided with a yoke turning about an axle, with a gear mounted on the movable end, meshing with two other gears and periodically rolling about one or the other of said gears, the yoke periodically releasing and checking the driven shaft.

It will be understood that the foregoing general description and the following detailed description as well are exemplary and explanatory of the invention but are not restrictive thereof.

Figure 1:
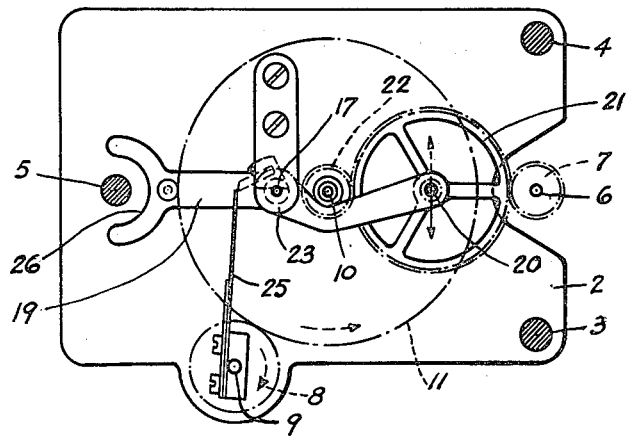
Figure 1 is a vertical sectional view taken through a preferred and illustrative embodiment of the present invention, the section being taken just back of the forward plate of the illustrated embodiment.
Figure 2:
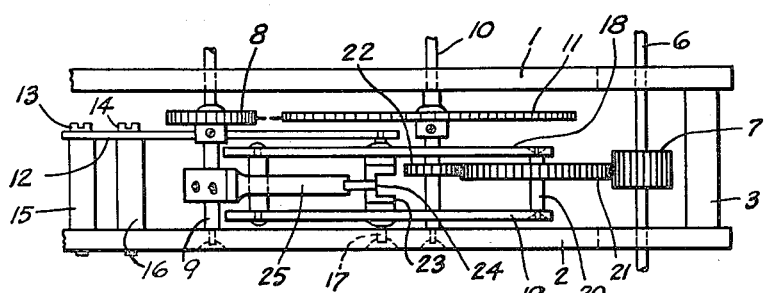
Fig. 2 is a bottom plan view with the various shafts rearranged and more widely spaced for greater clarity.

The present preferred and illustrative embodiment of the invention is shown in Figures 1 and 2 of the accompanying drawings in which there are provided two side plates 1 and 2 spaced apart by means of the three columns 3, 4 and 5 and in which the gearing arrangement by which the torque of the meter controlled shaft 6 is transmitted to a driven shaft 10 which may serve to control suitable recording or registering mechanism. Shaft 6 is coupled to a driver pinion 7. Driven shaft 10 is provided with a gear 11 which meshes with a driven pinion 8 carried by a powered shaft 9 which is driven from a servomotor, not shown, and which preferably comprises a torque motor or other form of motor which can be permanently connected and is not injured by being stalled.

The servomotor driving the shaft 9 and gear 8 provides the source of power for the operation of the amplifier. The shaft 10 of gear 11 also carries a pinion 22 which meshes with gear 21, gear 21 in turn being meshed with pinion 7. Gear 21 is carried by an idler shaft 20 which is rotatably mounted in the ends of yoke members 18, 19 the yoke being pivotally mounted by means of a shaft 17 which is pivoted between the face plate 2 and a cross piece 12, secured to the interior of the face plate 2 by means of the spacing columns 15 and 16 and screws 13 and 14. Pinions 7 and 22 are preferably of the same size and the shafts 6, 20, 10 and 17 are normally arranged in the same horizontal plane, but any rotation of the pinion 7 in the direction of the arrow causes the gear 21 to be moved downwardly in its yoke, while it may be restored to its normal position by means of a corresponding rotation of the pinion 22, but any movement of the gear 21 upwardly or downwardly causes a corresponding pivotal movement of the shaft 17 and the yoke members 18 and 19.

Shaft member 17, on which the yoke members 18 and 19 are pivotally mounted, carries a pallet shaped stop member 23 having a recess 24 which is adapted to engage and release the free end of leaf-spring stop member 25, this stop member being rigidly mounted on the shaft 9 so that it rotates with rotation of the shaft 9.

The yoke members 18 and 19 are provided with forked ends 26 which partially surround the post 5 and form a limiting stop to prevent excessive displacement of the gear 21 with respect to the pinions 7 and 22, thereby preventing these gear members from going out of mesh with each other.

In the operation of the embodiment shown in Figures 1 and 2, the motor impresses its torque on shaft 9 which is prevented from running by the spring 25 and the stop 23. If the meter controlled shaft 6 turns in the direction of the arrow, the gear 21 rolls around on the stationary gear 22 and the shaft 20 swings the yoke downwardly out of the plane of the axes, which causes the stop 23 to move away from the axis 9. This continues until the spring 25 falls off the stop 23 and shaft 9 makes a full turn urged by the torque of the motor, stop spring 25 passing through the gap 24. In doing so, the gear 21 is driven by means of the gears 8, 11, 22 in the arrow direction shown by broken line and rolls about the relatively slowly turning gear 6 of the control shaft whereby the shaft 20 with the swinging yoke is swung back and the stop 23 catches the spring 25 again after its full turn. The two legs 18, 19 of the swinging yoke are extended to form a fork 26 which embraces the column 5 and prevents the shaft 20 from being swung so far out of the plane of the axis that the gear 21 is disengaged from the gears 7 and 22. The transmission ratios of the gears are such that four releases take place per each full turn of the control shaft 6 and that the driven shaft 10 makes a complete turn in four steps. The swivel angle of the stop 23 may be made very small, and the bearing surface may be inclined to the swiveling direction in such a way that the angle of friction is approximately abolished. The journals of the shafts 20 and 24 are preferably mounted in jewels, so as to produce with the arrangement described a minimum load for the control shaft 7.

Figures 3, 5:
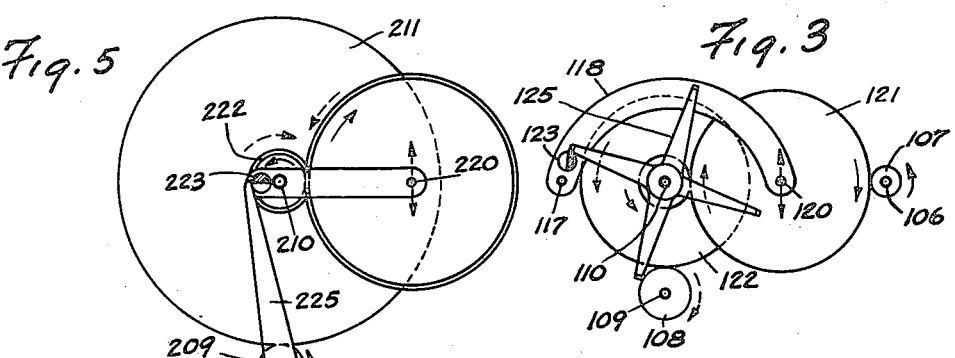
Figure 3 is a schematic side elevation similar to Figure 1 but showing a modified embodiment of the present invention.
Figure 5 is a schematic side elevation of another modification of the present invention; and, Figure 6 is a similar bottom plan view of the modification also shown in Figure 5.
Figures 4, 6:
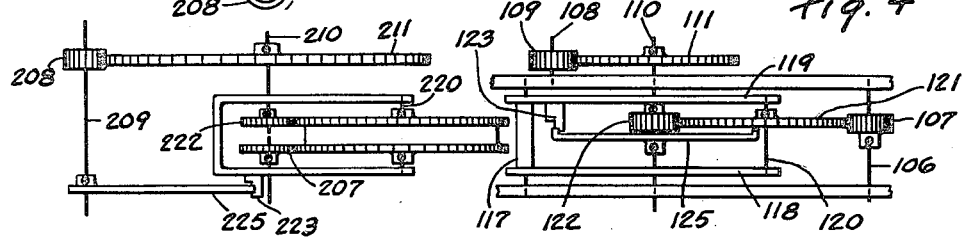
Figure 4 is a schematic bottom plan view.

The modified embodiment shown in Figures 3 and 4 represents an additional form of a torque amplifier according to the present invention, in which the escapement is a ratchet wheel with four arms 25 arranged on the driven shaft itself. The stop 23 is here constructed as a simple cylindrical stop, and when the yoke is swung in the direction of the arrow shown in solid line, on being driven by the control shaft 106, the stop 123 is swung against the driven shaft 110 and the arm 125 passes through the gap 124. During a quarter-turn of the driven shaft 110 the gear 121 rolls back into the initial position and the stop 123 catches again the next arm 125. This example of embodiment allows of a more rugged construction than the examples shown in Figures 1 and 2, the load of the controlling shaft being, however, greater. The swing of the axis 120 out of the plane by the axes 106, 110, 117 must be small only, because otherwise the two gears 107 and 121 will be disengaged.

In a third and modified embodiment represented by Figures 5 and 6, the gears 207, 221 and 222 are arranged to form a planetary gear, and the driving shaft 206 and the driven shaft 210 are arranged in the same axis in which the yoke with the legs 218, 219 and the stop 223 is mounted to swing. The motor drives the shaft 209, on which, in analogy with the first example, a blocking arm 225 is arranged which bears against the stop 223. This arrangement offers the advantage that the axle 220 can turn at any desired angle about the axles 206 and 210 without the engagement of the gears 207, 221, 222 being changed.

The invention in its broader aspects is not limited to the specific mechanisms shown and described but departures may be made therefrom within the scope of the accompanying claims without departing from the principles of the invention and without sacrificing its chief advantages.

What is claimed is:

1. A torque amplifier for measuring apparatus and the like to amplify the torque between a driving and a driven shaft including in combination a yoke pivoted to swing about an axle and having a free end, a gear mounted on the free end of the yoke, two gear members mounted on fixed axes and meshing with said gear on opposite sides thereof so that swinging movement of the yoke and its supported gear causes the gear to roll about one of the gear members while meshing with both of the gear members, and means controlled by movement of said yoke for intermittently releasing and stopping the driven shaft.

2. A torque amplifier as claimed in claim 1 in which the gear, two gear members and yoke pivot normally lie in substantially a single plane.

3. A torque amplifier as claimed in claim 1 in which one of said gear members is on the driving shaft and the other of said gear members is on the driven shaft.

4. A torque amplifier as claimed in claim 1 in which said yoke is provided with a forked end and a fixed stop is engageable therewith to limit movement of the yoke and its supported gear to maintain the mesh of the gear and gear members.

5. A torque amplifier as claimed in claim 1 in which the intermittently releasing and stopping member comprises a plural armed member engageable with a stop on the yoke member.

6. A torque amplifier as claimed in claim 1 in which a planetary gearing is provided between the driving and driven shafts and controls the controlling means for intermittently releasing and stopping the driven shaft.

7. A torque amplifier as claimed in claim 1 in which the releasing and stopping means comprises a leaf spring carried by the driven shaft and controlled by a stop actuated by the driving shaft.

References Cited in the file of this patent

FOREIGN PATENTS 960,179     France _____ Oct. 17, 1949